US007972666B2

(12) United States Patent
Johnson et al.

(10) Patent No.: US 7,972,666 B2
(45) Date of Patent: Jul. 5, 2011

(54) COATING COMPOSITIONS FOR FORMING INKJET-RECEPTIVE COATINGS ON A SUBSTRATE

(75) Inventors: Edward Johnson, Pompton Lakes, NJ (US); David K. Hood, Basking Ridge, NJ (US)

(73) Assignee: ISP Investments Inc., Wilmington, DE (US)

( * ) Notice: Subject to any disclaimer, the term of this patent is extended or adjusted under 35 U.S.C. 154(b) by 1412 days.

(21) Appl. No.: 11/207,159

(22) Filed: Aug. 18, 2005

(65) Prior Publication Data

US 2007/0042141 A1 Feb. 22, 2007

(51) Int. Cl.
*B41M 5/00* (2006.01)
*C09D 11/02* (2006.01)

(52) U.S. Cl. .................. 428/32.26; 106/31.6; 106/31.13

(58) Field of Classification Search ..................... 428/32
See application file for complete search history.

(56) References Cited

U.S. PATENT DOCUMENTS

| | | | | |
|---|---|---|---|---|
| 5,518,809 | A * | 5/1996 | Henry et al. | 428/32.14 |
| 5,521,002 | A * | 5/1996 | Sneed | 428/331 |
| 6,471,811 | B1 * | 10/2002 | DeBoer | 156/235 |
| 2002/0182376 | A1 * | 12/2002 | Mukherjee et al. | 428/195 |
| 2005/0027068 | A1 * | 2/2005 | Kopolow et al. | 524/808 |
| 2005/0146589 | A1 * | 7/2005 | Gibbison et al. | 347/105 |
| 2007/0032588 | A1 * | 2/2007 | Hood | 524/493 |
| 2007/0043161 | A1 * | 2/2007 | Hood | 524/502 |
| 2007/0092666 | A1 * | 4/2007 | Hood et al. | 428/32.34 |

* cited by examiner

*Primary Examiner* — Melvin C Mayes
*Assistant Examiner* — Yun Qian
(74) *Attorney, Agent, or Firm* — William J. Davis; Thompson Hine LLP

(57) ABSTRACT

Coating compositions for forming inkjet-receptive coatings on a substrate which are glossy, dry rapidly, provide good color density, exhibit low density loss, and are water-resistant, include (a) a crosslinkable cationic terpolymer, (b) an adhesion promoter, (c) a crosslinker, (d) a binder, and (e) water.

18 Claims, No Drawings

COATING COMPOSITIONS FOR FORMING INKJET-RECEPTIVE COATINGS ON A SUBSTRATE

BACKGROUND OF THE INVENTION

1. Field of the Invention

This invention relates to inkjet-receptive coating compositions, and, more particularly, to coating compositions of a cationic terpolymer which provide advantageous inkjet-receptive coatings on a substrate.

2. Description of the Prior Art

The image quality of inkjet printing has begun to approach that of silver halide photography and these advances have carried inkjet printing to the point where a further advance now depends on the quality of inkjet papers. An inkjet printed image on plain paper is generally inferior to a silver halide image on photographic paper, but it becomes difficult to distinguish between the two when the inkjet printing is performed on high-grade photo paper.

Currently, three types of inkjet paper are used: cast-coated, swelling and microporous. Cast-coated paper provides limited image quality as its base paper absorbs ink. Swelling and microporous papers use a polyethylene (PE) coated base paper that makes the base impermeable to ink. The PE coated bases, however, do not absorb ink; hence the image quality of swelling and microporous papers depends chiefly on the mechanisms of the image receiving layers. Swelling papers consist mainly of water-soluble polymers, offering high optical density, but slow drying, disadvantageous curl and low water resistance. Printing on plastic or fabric presents even more challenges particularly with respect to achieving fast ink drying times.

Accordingly, it is an object of this invention to provide new and improved inkjet-receptive coatings, and compositions therefor, and, particularly, to such compositions which will provide glossy inkjet-receptive coatings on a substrate.

Another object of the invention is to provide a compatible coating composition of a cationic terpolymer which can be coated onto a substrate such as paper, polyester or vinyl, to receive a glossy inkjet image.

Still another object herein is to provide an inkjet-printed image which dries rapidly, has good color density, low color density loss, and is water-resistant.

SUMMARY OF THE INVENTION

What is described herein is a compatible inkjet-receptive coating composition for forming glossy, inkjet-receptive coatings on a substrate. The composition includes the following ingredients:

(a) a crosslinkable cationic terpolymer, (b) an adhesion promoter, (c) a crosslinker, (d) a binder, and (e) water.

Suitably, the ingredients, by weight, comprise (a) 10-50%, preferably 25%; (b) 5-50%, preferably 15%; (c) 2-12%, preferably 8%; and (d) 5-20%, preferably 15%.

DETAILED DESCRIPTION OF THE INVENTION

A representative coating composition of the invention is given in Table 1 below.

TABLE 1

| Ingredient | Function | Amount (g) |
|---|---|---|
| ViviPrint ™ 200 (ISP)[(a)] | terpolymer/mordant | 50 |
| ViviPrint ™ 650 (ISP)[(b)] | mordant for ink/binder | 2 |
| UCAR ® 313 Latex (Dow) | binder[(e)] | 15 |
| AQUAZOL ® 200 (30%) (ISP) © | adhesion promoter | 25 |
| CP 349W (Eastman) | adhesion promoter | 5 |
| ANCAREZ ® AR 550 (Air Products)[(d)] | crosslinker | 8 |
| Barium chloride dihydrate | soluble salt[(g)] | 0.9 |
| Titanium dioxide (Millennium 6157-99) | pigment[(f)] | 5 |
| Surfactant 10G (5%) (Arch) | surfactant | 2 |
| Water | | 75 |
| pH 9 | | |
| viscosity 200-400 cps | | |

(a)terpolymer of quaternized vinyl caprolactam (VCL)/dimethylamino propyl methacrylamide (DMAPMA)/hydroxyl ethyl methacrylate (HEMA), suitably, by wt., 60-90 VCL, 10-30% DMAPMA, and 2-10% HEMA (b)quaternized poly(vinylpyrrolidone-co-dimethylaminoethyl methacrylate) copolymer in water (c)polyethyloxazoline (d)polyepoxy resin (e)others include polyvinyl alcohol, gelatin, starch (f)clay, alumina, calcium carbonate (g)aluminum chloride, aluminum sulfate, barium sulfate

Example 1

A. Preparation of Coating Composition of Invention

Mix One: 25 g water at pH 9 with NaOH
- 0.9 g barium chloride dihydrate
- 5 g titanium dioxide
- Mix well for 5 minutes with strong stirring Mix Two: 50 g water at pH 9 with NaOH
- 25 g AQUAZOL® 200 (30%)
- 50 g ViviPrint™ 200
- 2 g ViviPrint™ 650
- 15 g UCAR 313 Latex
- 5 g CP349W
- Mix thoroughly for 10 minutes. Avoid air entrapment.
- Slowly add Mix One to Mix Two. Stir 5 minutes.
- Add the following and stir for 5 minutes.
- 8 g ANCAREZ 550
- 2 g 5% Surfactant 10G
- Viscosity—272 cps
- Viscosity after 24 hours—390 cps

B. Preparation of Coated Substrates

Coated the formulation with a # 38 Meyer rod onto resin and cast coated paper, vinyl, canvas, polyester and untreated textiles. Dried at 135° C. for 10 minutes. The coatweight was between 12 and 16 g/m$^2$ depending on the substrate. Coarse materials, such as canvas and textiles, yield a higher coatweight.

C. Properties of Coated Substrate

The properties of paper coated with the invention composition are given below.

1. Gloss

The gloss of coated paper made with the composition of the invention was 81.3% at 60° (Glossmeter test).

2. Dry Times

TABLE 2

| | Invention* | Control (HP Premium Glossy Paper |
|---|---|---|
| HP dye ink | one minute | one minute |
| Epson pigment | 15 seconds | one minute (black rub-off) |
| Epson dye ink | 20 seconds | 45 seconds |

*Substantially no rub-off with all colors

3. Color Densities on Glossy Paper

TABLE 3

| | Invention | Control (HP Premium Glossy Paper |
|---|---|---|
| HP dye ink | K 2.60 | 2.44 |
| | C 1.18 | 1.12 |
| | M 2.64 | 2.64 |
| | Y 1.35 | 1.21 |
| Epson pigment | K 2.61 | 2.43* |
| | C 1.20 | 1.05 |
| | M 1.71 | 1.61 |
| | Y 1.26 | 1.02 |

*Substantial rub-off

The data shows that color densities of the coatings of the invention match or exceed those of the control media.

4. Xenon Fade on Melinex Substrate*

TABLE 4

| | Invention | HP Dye (Control) |
|---|---|---|
| HP dye ink | K 13.8 | 14.3 |
| | C 22.0 | 21.0 |
| | M 11.0 | 13.2 |
| | Y 1.7 | 6.8 |
| Epson pigment | K 0 | 0 |
| | C 0 | 2.0 |
| | M 0 | 1.0 |
| | Y 0 | 0 |
| Epson dye | K 11.6 | 12.2 |
| | C 25.3 | 18.2 |
| | M 6.5 | 16.0 |
| | Y 1.2 | 1.6 |

*% Density loss after 24 hours

The data in Table 4 shows that the composition of the invention with pigment exhibits little fade; and dye fade values are comparable to control.

5. Water Resistance

A strip of sample containing blocks of K, C, M, Y at full value color level was suspended in stirred DI water at room temperature for 30 minutes. The sample was then air dried and the densities measured. These numbers were compared to the readings on the untested blocks. The values in Table 5 represent % loss. The substrate here is raw canvas coated with the invention formulation at 20 g/m$^2$.

TABLE 5

| | HP Dye Ink | Epson Pigment Ink |
|---|---|---|
| K | 25.5 | 5.5 |
| C | 11.4 | 11.7 |
| M | 25.1 | 10.0 |
| Y | 21.6 | 6.9 |

The data in Table 5 shows that the coated canvas exhibited water resistance.

While the invention has been described with particular reference to certain embodiments thereof, it will be understood that changes and modifications may be made which are within the skill of the art.

What is claimed is:

1. A coating composition for making inkjet-receptive coatings on a substrate, comprising (a) a crosslinkable cationic terpolymer, wherein the terpolymer is a terpolymer of quaternized vinyl caprolactam (VCL), dimethylaminopropyl methacrylamide (DMAPMA) and hydroxyl ethyl methacrylate (HEMA), (b) adhesion promoter, (c) crosslinker, (d) binder, and (e) water, wherein said binder comprises a quaternized poly(vinylpyrrolidone-co-dimethylaminoethyl methacrylate) copolymer.

2. A coating composition according to claim 1 wherein (a) is 25%; (b) is 15%; (c) is 8%; and (d) is 15%.

3. A coating composition according to claim 1 wherein, by weight, the terpolymer comprises 60-90% VCL, 10-30% DMAPMA, and 2-10% HEMA.

4. A coating composition according to claim 3 wherein, by weight, (a) is 10-50%; (b) is 5-50%; (c) is 1-12%; and (d) is 5-20%.

5. A coating composition according to claim 3 wherein, by weight, (a) is 10-50%; and (d) is 5-20%.

6. A coating composition according to claim 1 wherein (c) is a polyepoxy resin.

7. A coating composition according to claim 1 wherein (b) is a polyethyloxazoline.

8. A coating composition according to claim 1 wherein (d) further includes a binder selected from the group consisting of polyvinyl alcohol, gelatin, starch, latex and combinations thereof.

9. A coating composition according to claim 1 which also includes one or more of barium chloride, aluminum sulfate, aluminum chloride, barium sulfate, titanium dioxide and a surfactant.

10. A coating composition according to claim 1 having a pH of about 9.

11. A coating composition according to claim 1 having a viscosity of about 200-400 cps.

12. An inkjet-receptive coated substrate coated with the composition of claim 1.

13. An inkjet-receptive coated substrate coated with the composition of claim 3.

14. An inkjet-receptive coated substrate coated with the composition of claim 3.

15. An inkjet-receptive coated substrate coated with the composition of claim 6.

16. An inkjet-receptive coated substrate coated with the composition of claim 7.

17. An inkjet-receptive coated substrate coated with the composition of claim 8.

18. An inkjet-receptive coated substrate coated with the composition of claim 9.

* * * * *